PLURAL CHANNEL AMPLITUDE DISCRIMINATOR HAVING DIFFERENTIATOR MEANS IN EACH CHANNEL AND A COMMON OUTPUT

Filed Sept. 12, 1958

WITNESSES

Edwin E. Bassler

James F. Young

INVENTOR

Joseph L. Goodman

BY Maury I. Hull

ATTORNEY

United States Patent Office
3,018,442
Patented Jan. 23, 1962

3,018,442

PLURAL CHANNEL AMPLITUDE DISCRIMINATOR HAVING DIFFERENTIATOR MEANS IN EACH CHANNEL AND A COMMON OUTPUT

Joseph L. Goodman, Glen Burnie, Md., assignor to Westinghouse Electric Corporation, East Pittsburgh, Pa., a corporation of Pennsylvania Filed Sept. 12, 1958, Ser. No. 760,673
7 Claims. (Cl. 328—150)

This invention relates to improvements in null detectors, and more particularly to a null detector employing a multivibrator which is fired when either of two signals applied to the null detector exceeds a predetermined value but which does not add signals.

The apparatus of the instant invention is especially suited to provide a substitute for null detectors of the type employing a thyratron circuit to give positive step control in gain changing at a certain signal level, and is adapted to operate at a temperature of 200° C., at which temperature a thyratron is unsuitable for use. The circuit of the instant invention is especially suitable to operate from square wave signals representing error signals in two separate channels. These signals may be in phase or 180 degrees out of phase, and the circuit is constructed and arranged to trigger when either one of the error signals reads at least a specified level, but the circuit does not add the two signal inputs.

In summary, the apparatus of the instant invention includes separate differentiator means for the two input signals, separate rectifiers poled in the same direction for the outputs of the separate differentiator means, the rectifiers having a common output lead, the signal on which triggers a multivibrator which controls the bias on a triode tube having a relay in the anode-cathode circuit thereof. For in-phase square wave error signals, one differentiated edge of each signal is of the wrong polarity to be passed by the rectifiers; the differentiated edge of the larger signal which is of the proper polarity to be passed by the associated rectifier places a back-bias on the other rectifier, preventing the smaller signal from being passed, so that no signal addition takes place. For out of phase square wave error signals, the differentiated edges passed by the rectifiers are not coincident in time, so that no signal addition takes place on the input lead to the multivibrator.

Accordingly, an object of the invention is to provide a new and improved null detector.

A further object is to provide a new and improved null detector suitable for use at high temperatures in the order of 200° C.

Figure 1:
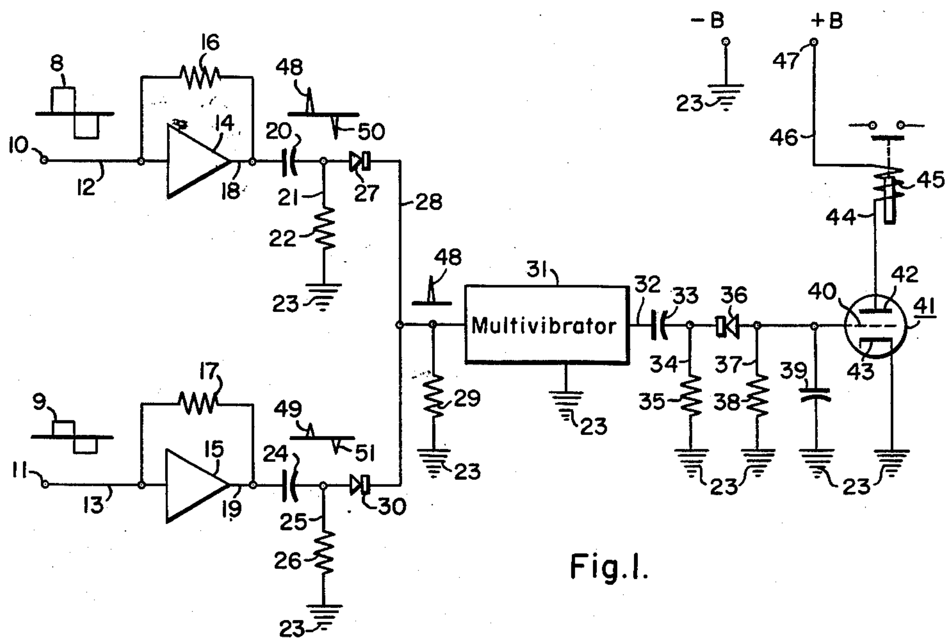
Figure 2:
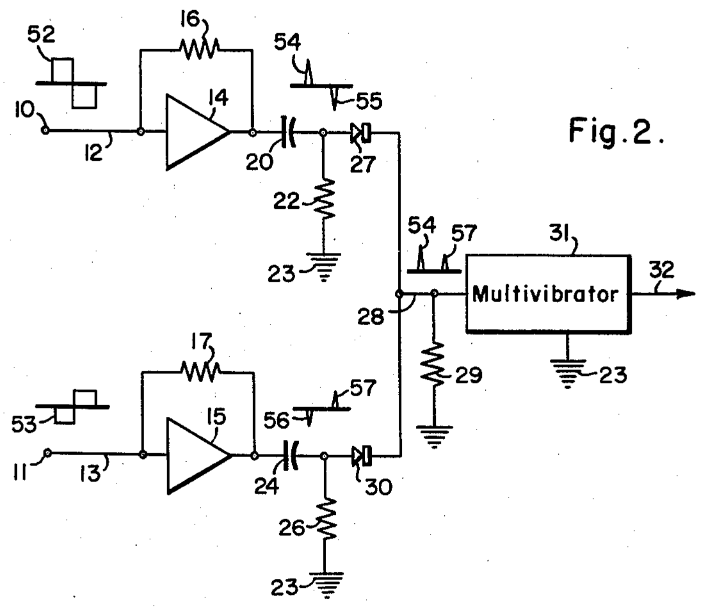

Other objects and advantages will become apparent after a study of the following specification when read in connection with the accompanying drawing, in which:

FIGURE 1 is a schematic electrical circuit diagram according to the preferred embodiment of the invention, and illustrates operation of the apparatus while two input pulses applied thereto are in phase; and FIG. 2 is a portion of the circuit of FIG. 1 illustrating operation of the apparatus while the two pulsed input signals applied thereto are 180 degrees out of phase with each other.

In FIG. 1, to which particular reference is made, a pair of input terminals 10 and 11 are connected by lead means 12 and 13 respectively to a pair of amplifiers 14 and 15 respectively, the amplifiers having feedback or stabilizing resistors 16 and 17 respectively connecting the output leads 18 and 19 thereof, respectively, to the input leads 12 and 13, respectively. The output lead 18 from amplifier 14 is connected by way of capacitor 20, lead 21 and resistor 22 to ground 23, whereas output lead 19 of amplifier 15 is connected by way of capacitor 24, lead 25 and resistor 26 to ground 23. Capacitor 20 and resistor 22 form a differentiator circuit, and capacitor 24 and resistor 26 form a differentiator circuit. The aforementioned lead 21 is connected by way of rectifier 27, lead 28 and resistor 29 to ground 23, and the aforementioned lead 25 is connected by way of rectifier 30 to the aforementioned lead 28. Lead 28 is connected to a multivibrator shown in block form at 31, the signals on lead 28 being used to trigger the multivibrator, in a manner to be hereinafter more fully described. Preferably capacitors 20 and 24 are of equal capacity values, resistors 22 and 26 have equal values of resistance, and rectifiers 27 and 30 are preferably similar to each other. The output of the multivibrator 31 is connected by way of lead 32, capacitor 33, lead 34 and resistor 35 to ground 23. The aforementioned lead 34 is connected by way of rectifier 36, lead 37 and resistor 38 to ground 23. Resistor 38 has capacitor 39 connected thereacross, and lead 37 is connected to the control grid 40 of an electron discharge tube generally designated 41, the tube having an anode 42 and cathode 43 which is connected to ground 23. The aforementioned anode 42 is connected by way of lead 44 to one end of the winding 45 of a relay, the other terminal of the winding 45 being connected by way of lead 46 to the positive terminal 47 of a suitable source of anode potential, not shown, having the negative terminal thereof connected to ground 23.

In the operation of the above described apparatus, the feedback amplifiers 14 and 15 in the two channels provide isolation and constant gain for the triggering level. Input pulses 8 and 9 are in phase, but pulse 8 is of greater amplitude than pulse 9, as shown. The amplifier outputs of each channel are differentiated by the R-C circuits to provide wave forms as shown, pulse 48 representing the differentiated positive-going edge of square wave signal 8 and pulse 50 representing the differentiated negative-going edge of square wave signal 8. As is well known in the art, differentiators may be characterized by an output which is proportional in amplitude to the amplitude of the input. Accordingly, differentiator output pulses 49 and 51 representing the differentiator output of the R-C network 24—26 are of smaller amplitude than pulses 48 and 50 respectively, because input pulse 9 is of smaller amplitude than input pulse 8. It should be noted that pulse 48 is coincident in time with pulse 49, and pulse 50 is coincident in time with pulse 51.

Negative pulses 50 and 51 are of the wrong polarity to pass through the rectifiers 27 and 30 respectively and thus are eliminated by rectifier action. Positive signal or pulse 48 is passed by rectifier 27 to lead 28.

Rectifiers 27 and 30 also prevent the addition of the two positive signals 48 and 49. Signal 48 on lead 28 places a back-bias or reverse bias on rectifier 30 due to the current flow through resistor 29, and this back-bias is coincident with the arrival at rectifier 30 of pulse 49. Pulse 49 being of lesser amplitude than the back-bias provided by pulse 48, is accordingly stopped by rectifier 30, and only pulse 48, if of sufficient amplitude, triggers multivibrator 31.

The multivibrator 31 provides the step action which is desired and which is provided in prior art apparatus by a thyratron. The bias level of the multivibrator 31 is maintained constant over the temperature range preferably by employing a gas reference tube supply, not shown. The output of the multivibrator 31 is rectified at 36 and supplies a negative bias to the control grid 40 of triode 41 the circuit of which contains the aforementioned plate circuit relay having winding 45 which may be used for gain changing or other control purposes. The relay is normally energized in the absence of an error signal, or an error signal below the specified amplitude applied to either of the circuit input terminals 10 or 11. An error signal having an amplitude over the prescribed minimum limit causes the multivibrator 31 to fire and remain firing while this limit is exceeded, and the pulse output of the multivibrator 31 applies a cutoff potential to the grid of the triode and thus deenergizes the relay. The time constant of the R-C circuit including capacitor 39 and resistor 38 is such that a sufficient negative bias remains on the control grid 40 between output pulses of the multivibrator 31 to maintain the tube 41 in a cutoff condition. As aforementioned, while the tube is cutoff, the relay having winding 45 is deenergized.

Particular reference should be made now to FIG. 2 in which a portion of the circuit of FIG. 1 is shown and in which the operation of the circuit of FIG. 1 while the two input signals or leads 12 and 13 are 180 degrees out of phase with each other is illustrated. Input pulse 52 on lead 12, FIG. 2, is of greater amplitude than input pulse 53 on lead 13 and 180 degrees out of phase therewith. Pulses 54 and 55 represent the differentiated positive-going and negative-going edges of input pulse signal 52, while pulses 56 and 57 represent the differentiated negative-going and positive-going edges of input pulse 53, and are of correspondingly smaller amplitude than pulses 54 and 55. Positive pulse 54 is coincident with negative pulse 56; negative pulse 56 is eliminated by rectifier 30 so that only positive pulse 54 appears on lead 28. It should be noted that there is no energy storage of the signal on lead 28. Negative pulse 55, which is coincident with positive pulse 57, is eliminated by rectifier 27, so that only positive pulse 57 appears on lead 28, at a time later than pulse 54, so that no signal addition takes place. Multivibrator 31 is triggered by pulse 54 which is over the minimum amplitude.

There has been provided then, apparatus well suited to accomplish the aforedescribed objects of the invention including the provision of a null detector with a signal generator means which provides an output control signal to utilization means when either one of two error signals has at least a specified amplitude, but which does not add the two error signal inputs.

Amplifiers 14 and 15 may be eliminated if desired.

Multivibrator 31 is preferably a one-shot multivibrator which delivers one output signal on lead 32 for each input pulse on lead 28 which has sufficient amplitude to trigger the multivibrator.

Tube 41 may be replaced by other amplifier means if desired.

Whereas the invention has been shown and described with respect to a preferred embodiment thereof which gives satisfactory results, it should be understood that changes may be made and equivalents substituted without departing from the scope of the invention.

I claim as my invention:

1. In null detector apparatus, in combination, first and second input circuit means having first and second inphase square wave signals simultaneously applied thereto, said first signal being of greater amplitude than said second signal, first and second differentiator means for differentiating the leading and trailing edges of the first and second square wave signals in said first and second input circuit means, each of said differentiator means providing an output consisting of a series of spaced pulses of alternating polarity having amplitudes proportional to the amplitude of the square wave signal applied thereto, the first differentiator means providing a pulse of positive polarity simultaneously with a pulse of positive polarity provided by the second differentiator means, first and second rectifier means having the outputs of the first and second differentiator means applied thereto respectively, common output circuit means for said first and second rectifier means, a pulse passed to said common output circuit means by said first rectifier means simultaneously placing a reverse bias on said second rectifier means whereby a differentiator pulse output consisting of only one differentiated edge selected from the leading and trailing edges of the first square wave signal of greater amplitude is passed to the common output circuit means, signal generator means connected to said common output circuit means for generating a control signal when a pulse of at least a predetermined amplitude occurs in said common output circuit means, and utilization means operatively connected to said signal generator means and having said control signal applied thereto.

2. In null detector apparatus, in combination, first and second input circuit means having first and second out-of-phase square wave signals simultaneously applied thereto, said second signal being of lesser amplitude than said first signal, first and second differentiator means for differentiating the leading and trailing edges of the first and second square wave signals respectively, each of said differentiator means providing an output consisting of a series of spaced pulses of alternating polarity having amplitudes proportional to the amplitude of the square wave signal applied thereto, the first differentiator means providing a pulse of positive polarity simultaneously with a pulse of negative polarity provided by the second differentiator means, first and second rectifier means poled in the same direction and operatively connected to said first and second differentiator means respectively, common output lead means for said first and second rectifier means, the first rectifier means passing to the common output lead means pulses of predetermined polarity in the output of the first differentiator means, the second rectifier means passing to the common output lead means pulses of the same polarity as said last-named pulses, the pulses passed by the second rectifier means being of lesser amplitude than the pulses passed by the first rectifier means, signal generator means connected to said common output lead means for generating a control signal when a first rectifier output pulse of at least a predetermined amplitude occurs on said common output lead means, and utilization means operatively connected to said signal generator means and having said control signal applied thereto, second rectifier means output pulses applied to said common output lead means being of insufficient amplitude to cause said signal generator means to generate a control signal.

3. In null detector apparatus, in combination, first and second input circuit means having first and second inphase square wave signals simultaneously applied thereto, said first signal being of greater amplitude than said second signal, first and second differentiator means for the signals in said first and second input circuit means, each of said differentiator means providing an output consisting of a series of spaced pulses of alternating polarity having amplitudes proportional to the amplitude of the square wave signal applied thereto, the first differentiator means providing a pulse of positive polarity simultaneously with a pulse of positive polarity provided by the second differentiator means, first and second rectifier means poled in the same direction and having the outputs of the first and second differentiator means applied thereto respectively, common output circuit means for said first and second rectifier means, a signal passed to said common output circuit means by said first rectifier means simultaneously placing a reverse bias on the second rectifier means whereby a differentiator pulse output corresponding to only one differentiated edge selected from the leading and trailing edges of the first square wave signal of greater amplitude is passed to the common output circuit means, multivibrator means operatively connected to the common output circuit means and triggered by the pulse therein, relay means, and circuit means connecting said relay means to said multivibrator means for utilizing the output of multivibrator means to control the operation of the relay means.

4. In null detector apparatus, in combination, first and second input circuit means having first and second out-of-phase square wave signals simultaneously applied thereto, said second signal being of lesser amplitude than said first signal, first and second differentiator means for differentiating the leading and trailing edges of the first and second square wave signals respectively, each of said differentiator means providing an output consisting of a series of spaced pulses of alternating polarity having amplitudes proportional to the amplitude of the square wave signal applied thereto, the first differentiator means providing a pulse of positive polarity simultaneously with a pulse of negative polarity provided by the second differentiator means, first and second rectifier means operatively connected to said first and second differentiator means respectively, common output lead means for said first and second rectifier means, the first rectifier means passing to the common output lead means pulses of predetermined polarity in the output of the first differentiator means, the second rectifier means passing to the output lead means pulses of the same polarity as said last-named pulses, the pulses passed by the second rectifier means being of lesser amplitude than the pulses passed by the first rectifier means, multivibrator means operatively connected to said common output lead means and triggered by a pulse of at least a predetermined amplitude in the common output lead means, relay means, and circuit means connecting said relay means to said multivibrator means for utilizing the output of the multivibrator means to control the operation of the relay means, pulses from the second rectifier means being of insufficient amplitude to trigger the multivibrator means.

5. In null detector apparatus, in combination, first and second input circuit means having first and second in-phase square wave signals simultaneously applied thereto, said first signal being of greater amplitude than said second signal, first and second differentiator means for the signals in said first and second input circuit means respectively, each of said differentiator means providing an output consisting of a series of spaced pulses of alternating polarity having amplitudes proportional to the amplitude of the square wave signal applied thereto, the first differentiator means providing a pulse of positive polarity simultaneously with a pulse of positive polarity provided by the second differentiator means, first and second rectifier means having the outputs of the first and second differentiator means applied thereto respectively, common output lead means for said first and second rectifier means, the first rectifier means passing to the common output lead means pulses of predetermined polarity in the output of the first differentiator means and the second rectifier means being poled in a manner to pass to the common output lead means pulses of the same polarity as said last-named pulses, the pulses of greater amplitude passed by the first rectifier means simultaneously placing a reverse bias on the second rectifier means whereby only one differentiator output pulse from the first rectifier means appears in the common output lead means, one shot multivibrator means operatively connected to said common output lead means and constructed and arranged to generate a multivibrator output pulse when a pulse of at least a predetermined amplitude appears in said common output lead means, electron discharge tube means having a grid operatively connected to receive the output of the one-shot multivibrator means, relay means, and circuit means interconnecting said relay means and said electron discharge tube means in a manner whereby the relay means is selectively deenergized while trains of pulses are being provided by the first rectifier means.

6. In null detector apparatus, in combination, first and second input circuit means having first and second out-of-phase square wave signals simultaneously applied thereto, said second signal being of lesser amplitude than said first signal, first and second differentiator means for differentiating the leading and trailing edges of the first and second square wave signals respectively, each of said differentiator means providing an output consisting of a series of spaced pulses of alternating polarity having amplitudes proportional to the amplitude of the square wave signal applied thereto, the first differentiator means providing a pulse of positive polarity simultaneously with a pulse of negative polarity provided by the second differentiator means, first and second rectifier means operatively connected to said first and second differentiator means respectively, common output lead means for said first and second rectifier means, the first rectifier means passing to the common output lead means pulses of predetermined polarity in the output of first differentiator means, the second rectifier means passing to the common output lead means pulses of the same polarity as said last-named pulses, the pulses passed by the second rectifier means being of lesser amplitude than the pulses passed by the first rectifier means, one shot multivibrator means operatively connected to the common output lead means and generating a multivibrator output pulse when the pulse in the common output lead means has at least a predetermined amplitude, electron discharge tube means having a grid operatively connected to the one shot multivibrator means to have the pulse from the one shot multivibrator means applied thereto, relay means, and circuit means interconnecting said relay means and said electron discharge tube means to selectively energize and deenergize said relay means, said relay means being deenergized while a series of pulses of said predetermined amplitude appear on the common output lead means.

7. In null detector apparatus, in combination, first and second input circuit means having first and second in-phase square wave signals simultaneously applied thereto, said first square wave signal being of greater amplitude than said second square wave signal, first and second differentiator means for the signals in said first and second input circuit means respectively, each of said differentiator means providing an output consisting of a series of spaced pulses of alternating polarity having amplitudes proportional to the amplitude of the square wave signal applied thereto, the first differentiator means providing a pulse of positive polarity simultaneously with a pulse of positive polarity provided by the second differentiator means, first and second rectifier means having the outputs of the first and second differentiator means applied thereto respectively, common output circuit means for said first and second rectifier means, the first rectifier means passing to the output circuit means pulses of predetermined polarity in the output of the first differentiator means, the second rectifier means being of a polarity to pass to the output circuit means pulses of the same polarity as said last-named pulses, the pulses of larger amplitude passed by the first rectifier means simultaneously placing a reverse bias on the second rectifier means whereby the second rectifier means is prevented from conducting and a differentiator pulse output corresponding to only one differentiated edge selected from the leading and trailing edges of the first square wave signal of larger amplitude is passed to the common output circuit means, signal generator means including multivibrator means connected to said common output circuit means and generating a multivibrator output when a pulse of at least a predetermined amplitude occurs in said common output circuit means, and utilization means including a relay operatively connected to said signal generator means, said relay being under the control of the output of said multivibrator means.

References Cited in the file of this patent

UNITED STATES PATENTS

| | | |
|---|---|---|
| 2,358,448 | Earp | Sept. 19, 1944 |
| 2,555,175 | Whitford | May 29, 1951 |

| | | |
|---|---|---|
| 2,725,467 | Atwood | Nov. 29, 1955 |
| 2,751,555 | Kirkpatrick | June 19, 1956 |
| 2,780,724 | Fickett | Feb. 5, 1957 |
| 2,781,478 | Cooke | Feb. 12, 1957 |
| 2,784,910 | Ghiorso et al. | Mar. 12, 1957 |
| 2,881,314 | Hoge et al. | Apr. 7, 1959 |

OTHER REFERENCES

Gillespie: Abstract of 685,589 650 OG 1195, Sept. 25, 1951.